US005786861A

United States Patent [19]
Parker

[11] Patent Number: 5,786,861
[45] Date of Patent: Jul. 28, 1998

[54] CLIPBOARDS ATTACHED TO COMPUTER KEYBOARD

[75] Inventor: Joan H. Parker, 302 Los Arboles Dr., Santa Fe, N. Mex. 87501

[73] Assignee: Joan H. Parker, Santa Fe, N. Mex.

[21] Appl. No.: 832,515

[22] Filed: Apr. 3, 1997

[51] Int. Cl.⁶ ........................................... B41J 11/02
[52] U.S. Cl. ................. 248/442.2; 248/918; 400/718
[58] Field of Search ............ 246/441.1, 442.2, 246/447, 452, 918; 400/679, 717, 718

[56] References Cited

U.S. PATENT DOCUMENTS

| | | | |
|---|---|---|---|
| 999,539 | 8/1911 | Anderson | 400/718 |
| 1,236,050 | 8/1917 | Caldwell | 248/442.2 |
| 4,372,518 | 2/1983 | Biasini | 248/441.1 |
| 4,546,947 | 10/1985 | Geston | 248/442.2 |
| 4,925,143 | 5/1990 | Sandmeyer | 248/441.1 |
| 5,341,929 | 8/1994 | Stefancin, Jr. | 248/442.2 |
| 5,383,642 | 1/1995 | Strassberg | 248/442.2 |
| 5,383,643 | 1/1995 | Koch | 248/447 |

FOREIGN PATENT DOCUMENTS

| | | | |
|---|---|---|---|
| 159550 | 2/1921 | United Kingdom | 248/442.2 |

*Primary Examiner*—Leslie A. Braun
*Assistant Examiner*—Robert Lipesik

[57] ABSTRACT

Clipboards for holding paper are attached to a computer keyboard via arm bases and a detachable clipboard structure such that the clipboards can also be used as a dustcover for said computer keyboard. The said clipboards are adjustable to provide multiple viewing positions for the computer keyboard user while using little desk space.

4 Claims, 7 Drawing Sheets

CLIPBOARDS ATTACHED TO COMPUTER KEYBOARD

BACKGROUND OF THE INVENTION

1. Field of the Invention

This invention relates in general to clipboards, and in particular a detachable clipboard structure that is attached to a computer keyboard such that the clipboards of the detachable clipboard structure are used for holding paper for the computer keyboard user and can also be used as a dustcover for the computer keyboard.

2. Prior Art

Clipboards and desktop stands for holding paper in viewing range of the computer keyboard user are in existence. Likewise, computer keyboard dustcovers are in existence. However, the present invention combines two clipboards and a dustcover into a single unit (detachable clipboard structure) which is attached to the computer keyboard to provide an easy view and an easy reach using little desk space. The present invention also provides multiple viewing positions of the clipboards for the computer keyboard user.

Prior Art is listed and discussed separately, below. All of the products listed below have brand names of Fellowes or Kensington. Whatever the features or merits of these references may be, none of them fully achieve the purposes of the present invention. Clips or Clipboards attached to the computer monitor:

A. "In View Workstation Organizer" (TM)(Patent Pending on Product)

A device such that a clipboard is strapped to each side of a computer monitor and the clipboards have attachments for holding items such as diskettes.

B. "Monitor View Clip" (No Patent Number on Product in store)

A device such that a single clipboard is attached to an arm which is attached to the computer monitor with an adhesive strip.

C. "Adjustable Copy Clip" (No Patent Number on Product in store)

A device such that a single clip is attached to the computer monitor with an adhesive strip.

D. "Deluxe Monitor View Clip" (No Patent Number on Product in store):

A device such that a flexible arm is attached to the computer monitor and a single clipboard is attached to the flexible arm such that the clipboard can tilt and swivel.

This block of text identifies the differences and/or advantages of the present invention versus clips or clipboards attached to the computer monitor. The present invention combines two clipboards and a dustcover into a single unit (detachable clipboard structure). Being attached to the computer keyboard, the present invention places the two clipboards close to the computer keyboard user to provide an easy reach and an easy viewing position using little desk space. The present invention provides multiple viewing positions of the clipboards for the computer keyboard user. The present invention is also a computer keyboard dustcover. Desktop Stands:

A. "Desktop Copy Holder" (No Patent Number on Product in store)

A device which sits on a desk such that a single clipboard is in the form of a stand having a ledge and a ruler.

B. "Premier Copyholder" (No Patent Number on Product in store)

A device such that a single clipboard is in the form of a stand that sits on a desk which has a vertical height adjustment, multiple angle positions, and swing arms for supporting oversized documents.

C. "Premier Flex Arm Copyholder" Patent Number on Product in store)

A device such that a single clipboard is attached to a flexible arm which is anchored to the desk or the CPU.

This block of text identifies the differences and/or advantages of the present invention versus desktop stands. The present invention combines two clipboards and a dustcover into a single unit (detachable clipboard structure). Being attached to the computer keyboard, the present invention does not require as much desk space. The present invention is also a computer keyboard dustcover.

Computer Keyboard Dustcovers

A. "Wrist Rest/Keyboard Cover" (Patent Pending on Product)

A device such that a computer keyboard sits on said device that can be partially folded to form a wrist rest or completely folded to form a computer keyboard dustcover.

B. "Keyguard" (No Patent Number on Product in store)

A device such that clear plastic can be formed to cover a computer keyboard.

This block of text identifies the differences and/or advantages of the present invention versus computer keyboard dustcovers. The present invention combines two clipboards and a dustcover into a single unit (detachable clipboard structure). The present invention is attached to the computer keyboard whereas other dustcovers are not. The present invention is also two clipboards which provide multiple viewing positions for the computer keyboard user.

SUMMARY OF INVENTION

The present invention has many differences and/or advantages when compared to the products listed in the "Prior Art" section. These differences and/or advantages were also described in the "Prior Art" section.

The present invention has many goals or objectives which include: 1) To provide two clipboards for holding working papers for a computer keyboard user. 2) The said clipboards are adjustable to provide multiple viewing positions for the computer keyboard user. 3) The clipboards are attached to the computer keyboard via the detachable clipboard structure and arm bases. 4) With the detachable clipboard structure being attached to the computer keyboard, the clipboards are within an easy reach and an easy view of the computer keyboard user. 5) Being attached to the computer keyboard, the detachable clipboard structure uses little desk space. 6) With the detachable clipboard structure being attached to the computer keyboard, the clipboards can be used as a dustcover for the computer keyboard. 7) The detachable clipboard structure can be removed from the computer keyboard. 8) The detachable clipboard structure has replaceable parts (two extension arms, a rod, or two clipboards). 9) The detachable clipboard structure and the said arm bases are designed to be part of the computer keyboard mold from the factory or to be an after market addition to the computer keyboard with means of attachment and preferably with the use of adhesive strips.

The foregoing goals or objectives can preferably be accomplished by attaching an arm base to each side of the computer keyboard. Each arm base will have a hole such that the extension arms of the detachable clipboard structure will slide into the hole of each arm base forming a snug fit.

The detachable clipboard structure comprises two extension arms, a rod, and two clipboards. The rod will extend perpendicular between the two extension arms with the rod fitting snugly into a hole in each extension arm. The rod and the hole of each extension arm will have a channel groove such that all channel grooves can be aligned. When all channel grooves are aligned, the clipboards are designed to slide into the channel grooves. While in the channel grooves, the clipboards can be slid left or right providing multiple viewing positions for the computer keyboard user. When the clipboards are slid to the center of the rod, the clipboards can be positioned to multiple angles for the computer keyboard user. While centered on the rod, the clipboards can be pulled forward and down forming a dustcover for the computer keyboard. The aforementioned rod with channel groove allows for multiple viewing positions of the 2 independent clipboards by sliding the clipboards to the left or to the right while positioned in the channel groove of the horizontal positioned rod. Possible independent clipboard positions include: 1) Both clipboards centered on the rod while touching allows multiple sheets of paper to be viewed side by side or a single sheet of paper of wider width to be viewed. 2) While allowing the two independent clipboards to remain touching, the clipbords can be horizontally slid in the rod groove to the far left end of the rod or to the far right end of the rod. 3) The independent clipboards can be separated and slid horizontally in the channel groove to the desired position along the rod including one clipboard to the far left end of the rod and the second clipboard being slid to the far right end of the rod. 4) One clipboard or both clipboards may be removed by being slid off either end of the rod.

DETAILED DESCRIPTION

Figure 1:
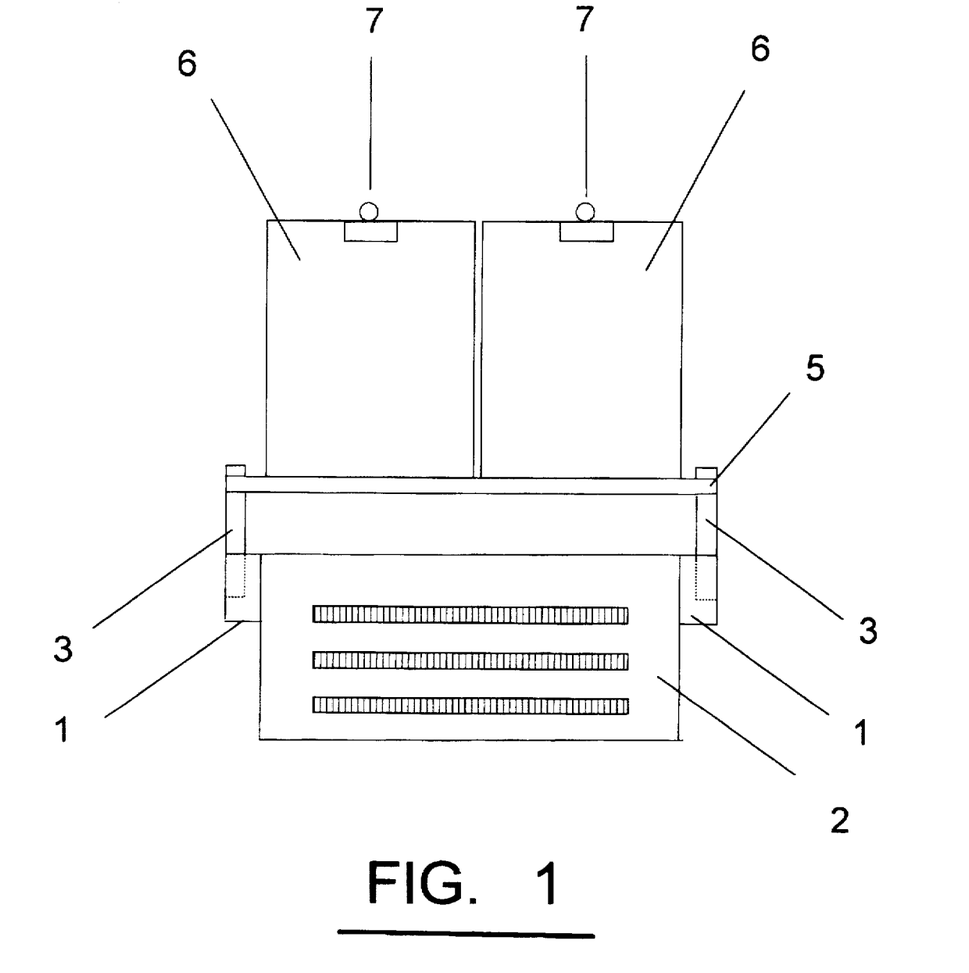
FIG. 1 a view of the detachable clipboard structure (two extension arms, a rod, two clipboards) and two arm bases attached to a computer keyboard in accordance with the present invention.

Refer now to FIG. 1, which is and overall drawing of a preferred embodiment of the present invention. As shown in FIG. 1, the present invention comprises two arm bases 1 and a detachable clipboard structure comprising two extension arms 3, a rod 5, and two clipboards 6. Preferably, the arm bases 1 would be made of the same material as the computer keyboard 2. The means of attachment of an arm base 1 to each side of the computer keyboard 2 can be accomplished preferably by having the arm bases 1 made as part of the computer keyboard mold from the factory or to be an after market addition with means of attachment to the computer keyboard 2 and preferably by use of adhesive strips. Being attached to the sides of the computer keyboard 2, the detachable clipboard structure does not touch the desk and therefore, uses little desk space. Also, being attached to the computer keyboard 2, the detachable clipboard structure is placed within an easy reach and an easy reading distance for the computer keyboard user.

Figure 2:
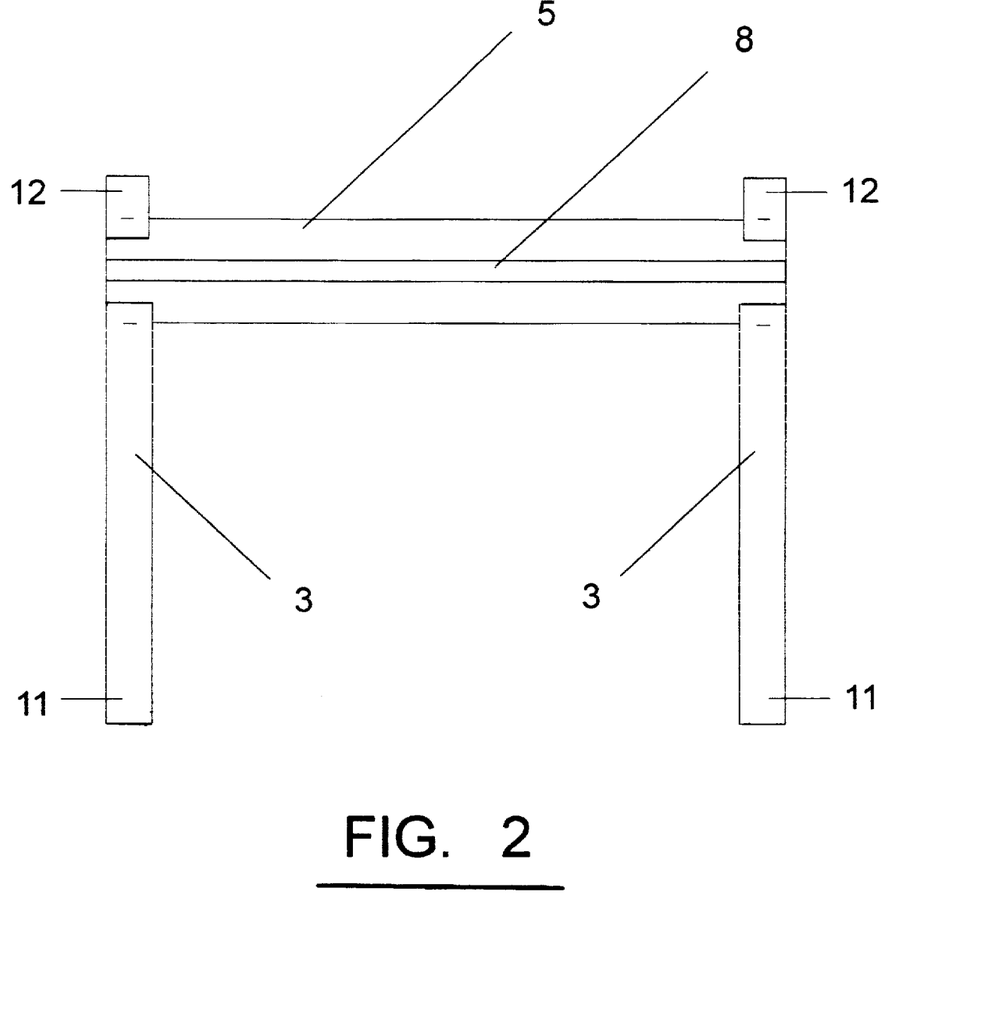
FIG. 2 is a view of a portion of the detachable clipboard structure and only showing the two extension arms and a rod with a channel groove of FIG. 1.
Figure 3:
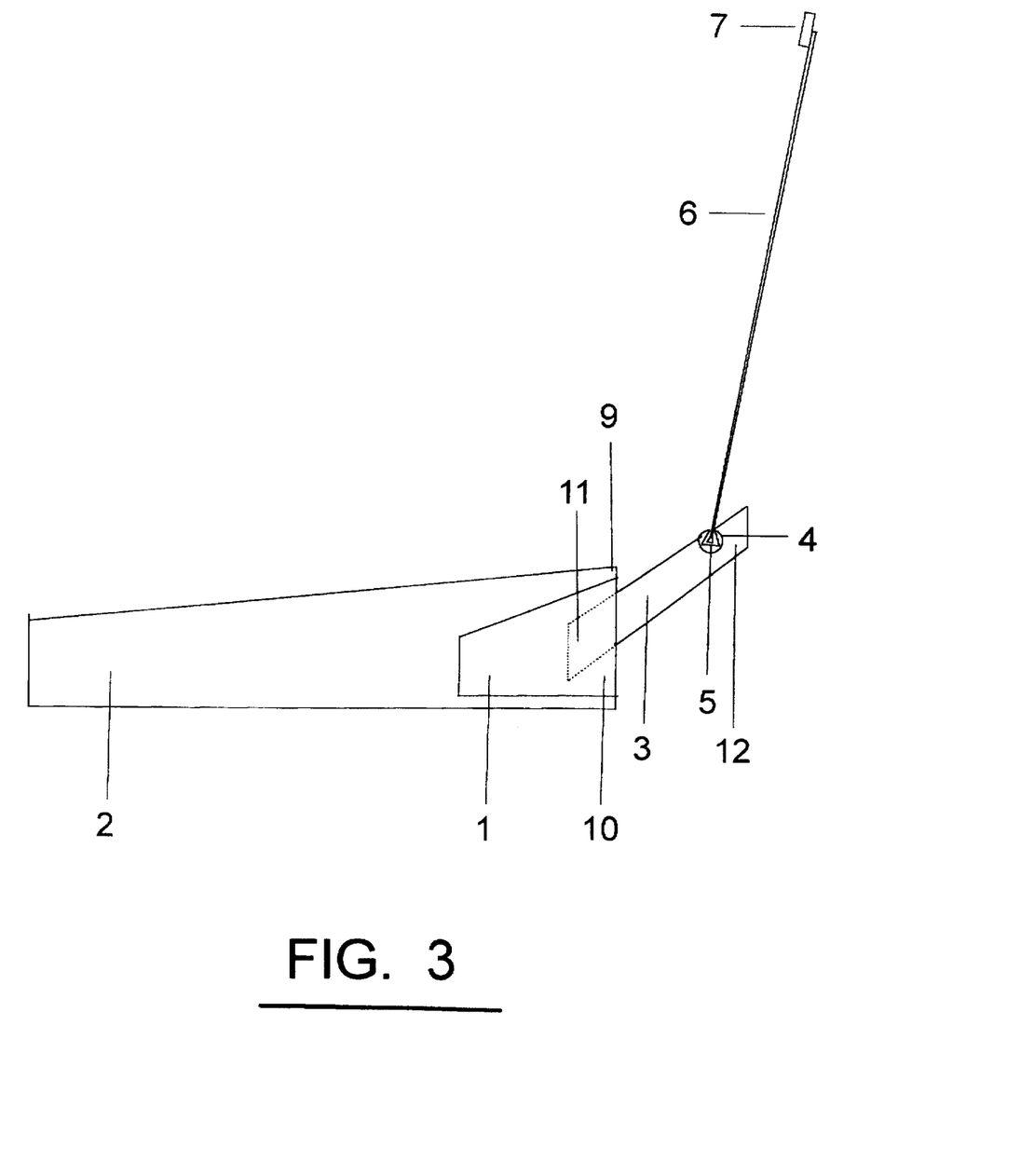
Fig. 3 is a side view of the detachable clipboard structure and two arm bases attached to a computer keyboard.

The detachable clipboard structure is preferably made of the same material as the computer keyboard 2 being assembled as a single unit and removable from said arm bases 1. For clarity of understanding, the detachable clipboard structure will be discussed as separate pieces (two extension arms 3, a rod 5, and two clipboards 6) with each being replaceable. Also for clarity, FIG. 2 shows two extension arms 3 and an attached rod 5 with a channel groove 8. The extension arms 3 are made such that the "from end" 11 will slide into a hole of the end A 10 of the arm bases 1 forming a snug fit. FIG. 3. The extension arms 3 will preferably extend in a horizontal direction 3.5 inches beyond the end B 9 of the computer keyboard 2.

As best shown in FIG. 3, preferably a hole 4 with a channel groove opening to the top surface of each extension arm 3 is preferably located 0.5 inch from the end C 12 of each extension arm 3.

Preferably a rod 5 with a channel groove 8 of triangular shape, FIG. 3, has a length such that the rod 5 extends from the outer side of one extension arm 3 to the outer side of the other extension arm 3, FIG. 2. The rod 5 has a diameter such that the rod 5 will fit snugly into the hole 4 of each extension arm 3 and rotate. Rotate the rod 5 until the channel groove 8 of the rod 5 aligns with the channel groove of the hole 4 in each extension arm 3.

The clipboard 6 is preferably made of the same material as the computer keyboard 2 with a height of 11.5 inches, a width of 0.9 inches and a clip 7, which holds the working papers, being located at the top center line of the clipboard 6 (opposite end from the base). The base of the clipboard 6 is of triangular shape, FIG. 3, matching the shape of the channel groove 8 of the rod 5. FIG. 3 best shows that the clipboard 6 is at a 110 degree angle from the top surface of the arm extension 3 when the clipboard 6 is slid into the channel groove of the hole 4 and the channel groove 8 of the rod 5. Sliding the clipboard 6 into the channel groove 8 of the rod 5 and clearing the extension arms 3 allows the clipboard 6 to adjust to other angles from the top surface of the arm extension 3 by rotating the rod 5. The clipboard 6 will remain in a stable position since the rod 5 is snugly fit into the hole 4 of each extension arm 3. The clipboard 6 will preferably slide freely to the left or to the right when inserted into the channel groove 8 of the rod 5.

Figure 4:
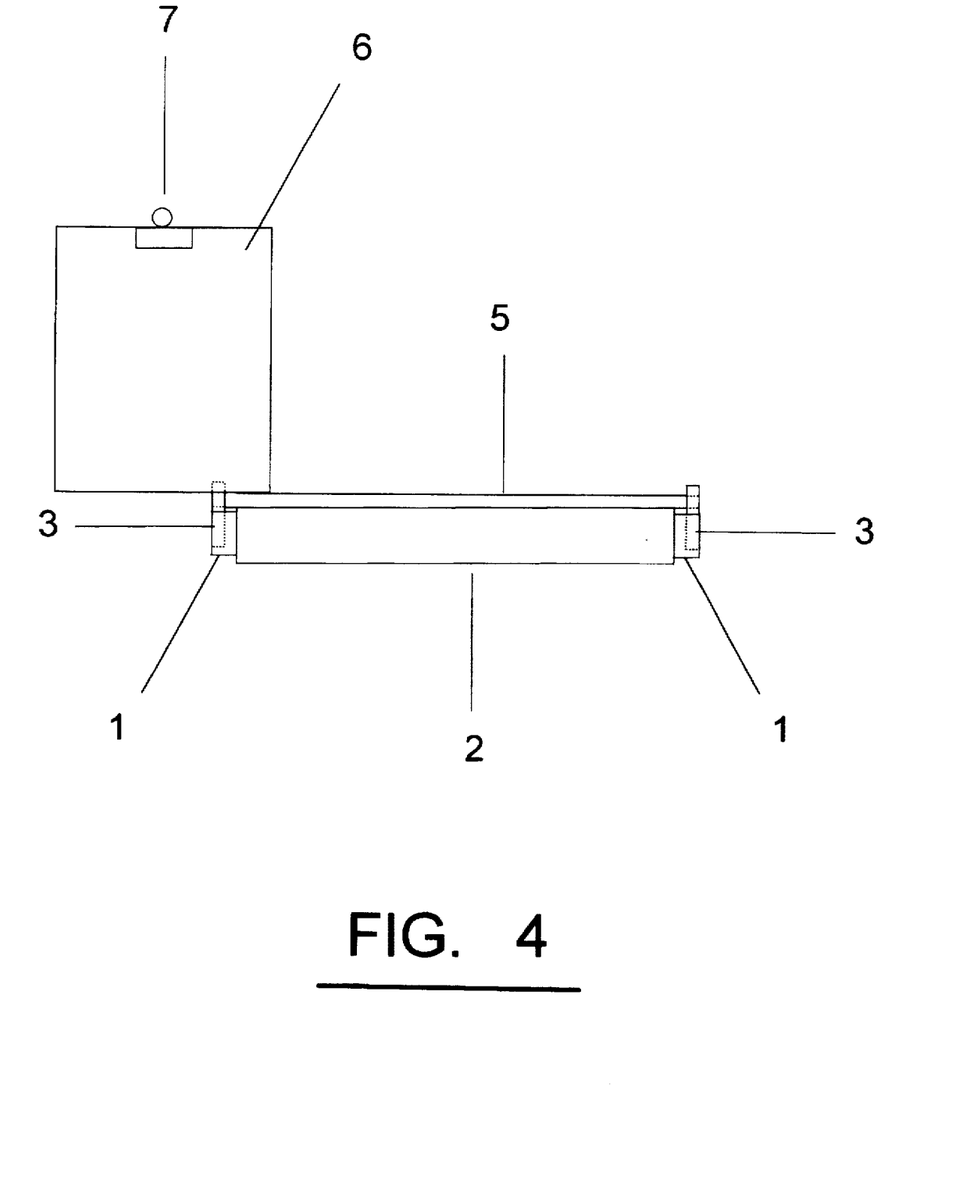
FIG. 4 is a front view showing a computer keyboard and a single clipboard partially slid into the channel groove of the said rod.
Figure 5:
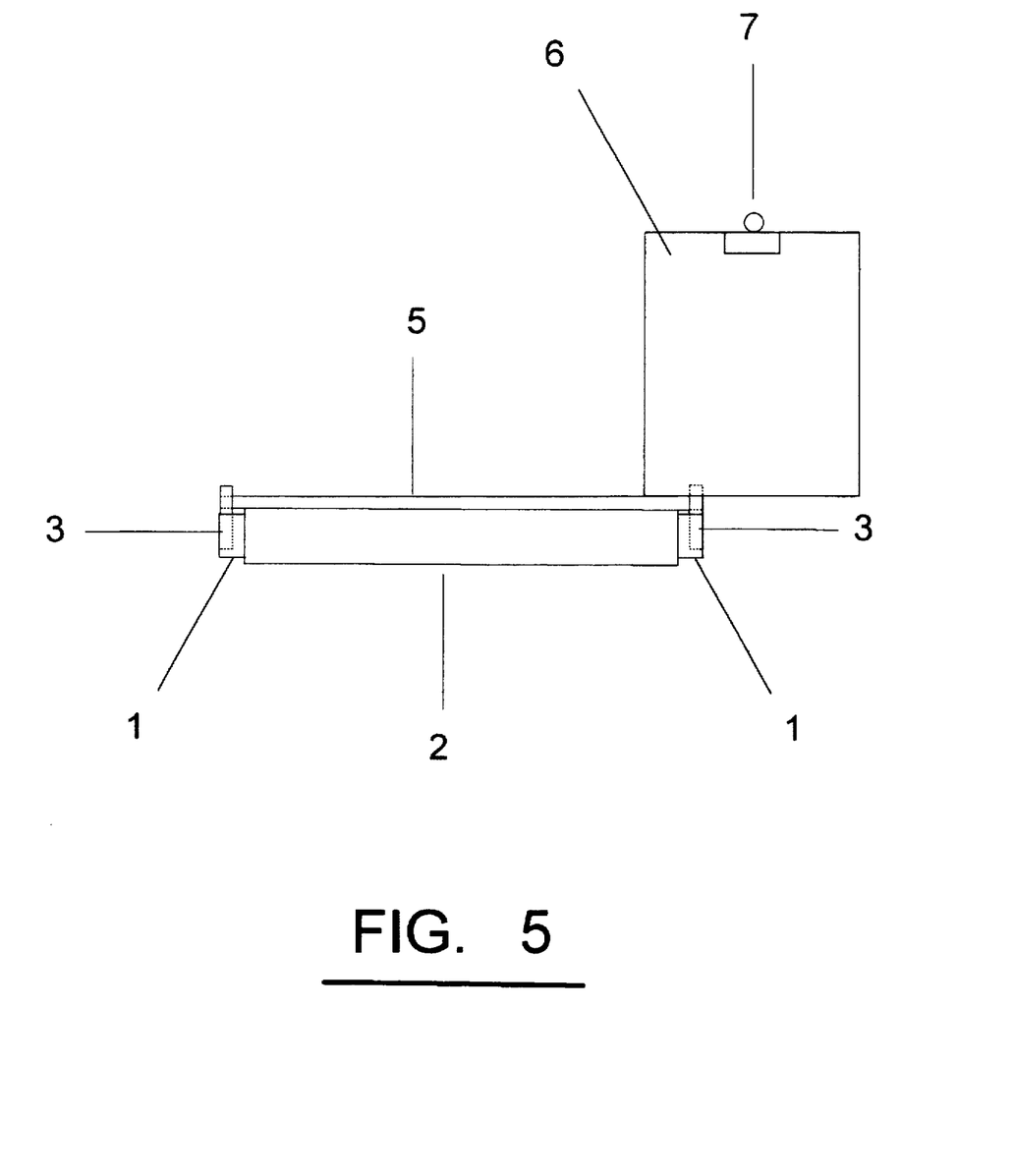
FIG. 5 is front view showing a computer keyboard and two clipboards partially slid into the channel groove of the said rod.
Figure 6:
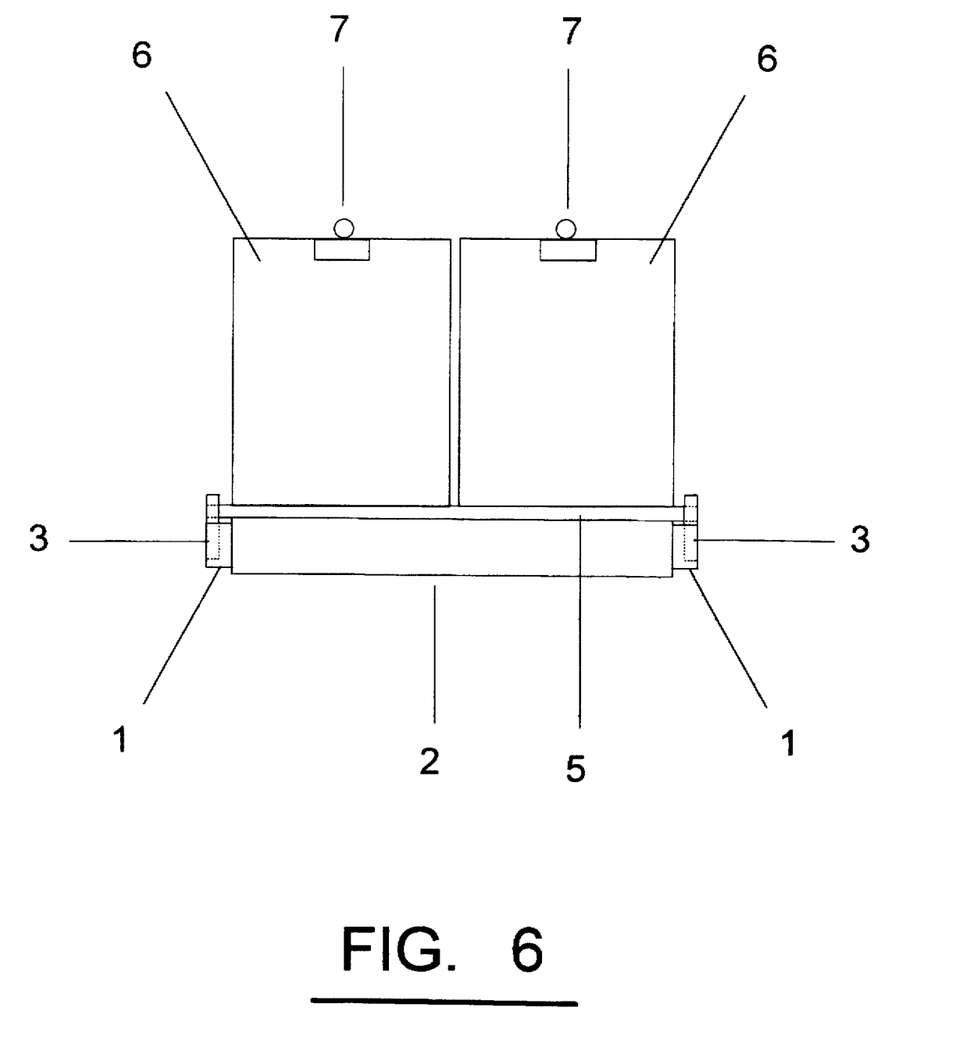
FIG. 6 is a front view showing a computer keyboard and two clipboards which have been slid to the center of said rod.
Figure 7:
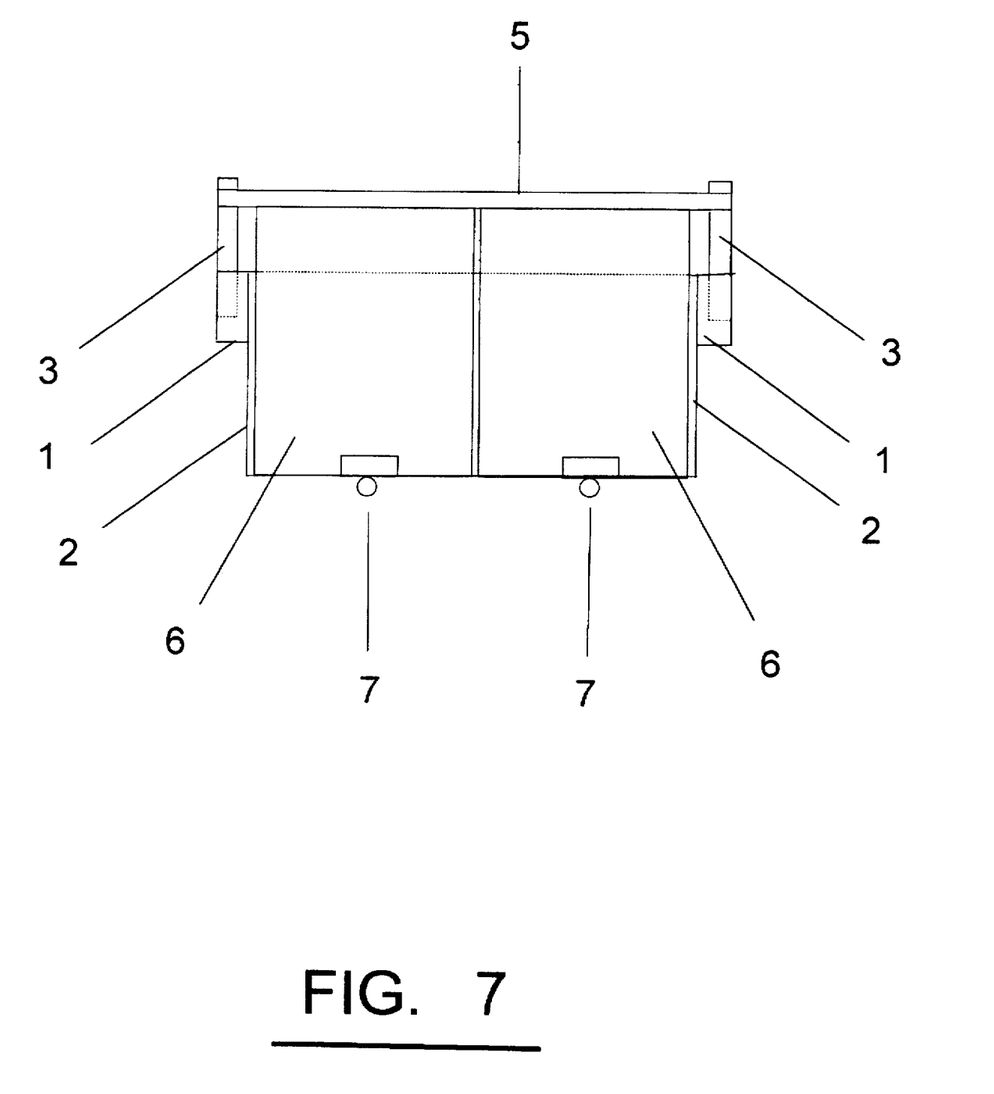
FIG. 7 is a top view of the said detachable clipboard structure and two arm bases attached to a computer keyboard such that said clipboards have been slid to the center of said rod, pulled forward and down forming a dustcover for the said computer keyboard.

As best shown in FIG. 4, 5, & 6, the ability of the clipboard 6 to slide freely to the left side or to the right side of the rod 5 allows for multiple viewing positions that a computer keyboard user may choose from to suit their working conditions while using little desk space. As best shown in FIG. 7, two clipboards 6 have been slid to the center of the rod 5, pulled forward and down forming a dustcover for the computer keyboard.

The aforementioned details describe how the present invention fulfills the goals or objectives described in the summary of the present invention. The present invention has provided:

1) Two clipboards 6 for holding working papers for a computer keyboard user.
2) The two clipboards 6 are adjustable to provide multiple viewing positions for the computer keyboard user.
3) The clipboards 6 are attached to the computer keyboard 2 via the arm bases 1 and the detachable clipboard structure.
4) The clipboards 6 are within an easy reach and an easy view of the computer keyboard user.
5) The detachable clipboard structure uses little desk space.
6) The clipboards 6 can be used as a dustcover for the computer keyboard 2.
7) The said detachable clipboard structure can be removed from the computer keyboard 2.
8) The said detachable clipboard structure has replaceable parts (two extension arms 3, a rod 5, or two clipboards 6).
9) The said detachable clipboard structure and the said arm bases can be part of the computer keyboard mold from the factory or an after market addition to the computer keyboard 2 with means of attachment and preferably with the use of adhesive strips.

The foregoing detailed description of the preferred embodiment of the present invention is not intended to limit the scope of the invention to the precise form disclosed. Many modifications and variations are possible.

What is claimed is:

1. A detachable clipboard structure for attachment to a computer keyboard, said detachable clipboard structure comprising a first and a second arm base adapted to be attached to the sides of the computer keyboard, a first extension arm having a first end attached within a hole in said first arm base and a second extension arm having a first end attached within a hole in said second arm base, a rod rotatably extending from a second end of said first extension arm to a second end of said second extension arm, said rod having an elongated channel groove therein and a pair of clipboards, each clipboard having a first end which is slidably positioned within said channel groove, whereby said clipboards are simultaneously rotatable about the elongated axis of said rod and slidably adjustable along said channel groove of said rod to provide multiple viewing positions for a computer keyboard user, said pair of clipboards adapted to provide a dustcover for the computer keyboard, adapted to use little desk space, and adapted to be within easy reach and easy reading distance of said computer keyboard user.

2. The detachable clipboard structure of claim 1 wherein said arm bases are adapted to be molded to said computer keyboard.

3. The detachable clipboard structure of claim 1 wherein said rod, clipboards, and extension arms are adapted to be removed from said arm bases for replaceability.

4. The detachable clipboard structure of claim 1 wherein each of said arm bases has a means thereon adapted to permit after-market addition of said detachable clipboard structure to said computer keyboard.

* * * * *